Oct. 31, 1972   R. P. GUTTERMAN ET AL   3,701,565
ARTICLE INPUT DEVICE FOR LIQUID-CONTAINING APPARATUS
Filed June 10, 1970   8 Sheets-Sheet 3

INVENTORS
ROBERT P. GUTTERMAN
LeBARON H. WASHINGTON
BY Cushman, Darby & Cushman
ATTORNEYS

Fig. 13.

3,701,565
Patented Oct. 31, 1972

3,701,565
ARTICLE INPUT DEVICE FOR LIQUID-CONTAINING APPARATUS
Robert P. Gutterman, Bethesda, Md., and Le Baron H. Washington, Annandale, Va., assignors to General Kinetics Inc., South Reston, Va.
Filed June 10, 1970, Ser. No. 45,199
Int. Cl. B65g 53/30
U.S. Cl. 302—14         6 Claims

ABSTRACT OF THE DISCLOSURE

For introducing articles into a container of liquid in which many of the articles will become suspended or float, the container is provided with a J-shaped inlet chute having its shorter leg opening through the bottom of the container. The longer leg of the chute extends above the level of liquid and below that level is provided with an aerator which produces an air/liquid slurry within the longer leg. This slurry has a lower specific gravity than the liquid alone, so articles dropped into the longer leg of the chute fall gently downwardly through the slurry, then bob upwardly in the chute shorter leg, through the container bottom opening and into the container. By preference, fluid jets are provided in the chute below the aerator to gently transfer the articles from the longer leg to the shorter leg of the chute.

BACKGROUND OF THE INVENTION

Many processing operations require the introduction of discreet articles into containers which hold bodies of liquid. Often the articles are difficult to transfer because of their own physical or chemical characteristics.

One good example is the transfer of fruits, such as tomatoes, peas, apples, cherries and asparagus, to mass washing, sorting or classifying apparatus in instances where the fruits are tender, such as tomatoes especially are, so that their collisions with solid or sharp objects or devices tending to mechanically squeeze them can make them unfit for their intended use and disrupt the process by contaminating the treating liquid with fruit juice. The need to introduce discreet articles into a container of liquid is not limited to the food processing field but is also a requirement in mining, ore processing, metals and plastics products manufacture, plating and repair, and in other fields. It is contemplated that the input device of the present invention has use in such additional fields wherever the task as described herein needs to be done.

However, for the sake of clarity and specificity in disclosing and particularly describing the invention herein, the invention will be hereinafter described in relation to a hydrodynamic tomato sorting system in which there is an acute need to be gentle to the tomatoes as they are introduced into the hydrodynamic sorter.

Presently about 5.2 million tons of tomatoes are processed each year in the United States. For a tomato processor, it is vital that the tomatoes be sorted and selected according to color and ripeness.

Color is of great importance for products such as ketchup and tomato juice. Viscosity is also important for these products.

Other tomato products include "market" tomatoes, such as are sold as fresh produce at a supermarket. These are tomatoes which are sort of "half-ripe and half-green" at the plant. They are tomatoes which are sufficiently ripe that they will ripen with age, but have not yet reached the stage where they are overripe so that they will spoil on their way to the store.

There is a developing, but still rather small, market for green tomatoes in the area of pickling, pickled tomatoes, and so forth.

Along the East Coast, tomatoes are still primarily picked by hand; but in California and other Western tomato-growing areas, tomatoes are frequntntly harvested by machine. Hand labor required to manually harvest tomatoes is becoming less and less available year by year. Accordingly, mechanization of the harvesting of tomatoes is not a matter of free choice, but a matter of necessity, it being necessary to convert to machine harvesting during the period of diminishing hand-labor supply in order to ensure that all of the tomatoes for which there is a market get harvested one way or the other. Thus during the 1967 harvesting season, there were between 900 and 1200 tomato-harvesting machines at work in California.

Generally, the machine tomato harvesters may be typified by the one shown in the U.S. patent of Button 3,390,-768, issued July 2, 1968. The harvester as it is driven along a row of tomato plants, severs the plants from the ground and conveys them to a station where the tomatoes are worked free of the vines by mechanical fingers. The vines are conveyed back onto the ground as mulch and the tomatoes, after being impinged upon by an air blast to separate dirt and small debris, are conveyed back along the sides on the machine where a number of people stationed on platforms adjacent the tomato conveying belts visually and tactually inspect and rough-sort the passing tomatoes. The sort that is involved at this stage separates bright tomatoes from green or damaged tomatoes which are culled and also dropped back on the ground as mulch. Before passing to a collecting station, the tomatoes which have passed the rough hand-sort are mechanically sized, with undersize being discarded. At the collecting station, the desirable tomatoes are placed in lug boxes which are carried along adjacent the harvesting machine by a separate tractor. Periodically, this tractor transports the boxed tomatoes back to a central processing plant where there may be a further manual or electrical/optical sorting of the tomatoes according to their degree of brightness.

While scientific advances in the breeding and growing of tomatoes, by increasing the likelihood of achievement of maturity by most individual tomatoes in a field at approximately the same time, has made once-over machine harvesting possible, the present state of the machine tomato-harvesting art still requires the services of about thirty hand-sorters per machine.

It is estimated that about 12 million man-hours per year are presently required for the manual sorting of tomatoes.

Conceptually, this represents a bottleneck diluting the potential economic benifit to be derived from the mechanical harvesting of tomatoes. While the harvesters treat the tomatoes in gross, the hand-sorters and electrical/optical sorters treat the tomatoes serially, having to look at or touch each tomato individually, at least once.

Bibliography

Others have worked in the past on techniques for separating fruits and vegetables into classes or grades, which techniques included sink/float separations. In particular, the sorting of peas appears to have been much studied as is evident from the following literature:

Periodicals

Walls, Dr. E. P.: "Pea Grading Work in 1936," The Canning Trade, Jan. 4, 1937
Jodidi, S. L.: "Maturity Test for Peas," Food Industries, September 1937

Burton, L. V.: "Quality Separation by Differences of Density," Food Industries, January, February, March, 1938

U.S. PATENTS

| Patentee | Number | Title |
|---|---|---|
| Olney | 1,474,284 | Vegetable Cleaner and Separator. |
| Plummer | 1,735,089 | Method and Apparatus for Treating and Handling Vegetative Products. |
| Chapman | 1,885,988 | Quality Grading. |
| Schmidt et al. | 2,040,569 | Fruit and Vegetable Grading Machine. |
| Thorold | 2,109,121 | Method and Apparatus for Grading Particles in Specific Gravity. |
| Bauer | 2,320,335 | Quality Grader. |
| Kerr | 2,355,735 | Do. |
| Morris | 2,828,860 | Process for Sorting Dried Peas. |

Some of the listed patents also allude to the usefulness of the processes and apparatus disclosed for the sorting of beans, berries, and corn.

Sink/float or other specific gravity-based sorting techniques have also been disclosed for separating frost-damaged fruit, particularly citrus fruit, from healthy fruit, for instance in these U.S. patents:

| Patentee | Number | Title |
|---|---|---|
| Parker | 1,252,833 | Gravity Fruit Separating Apparatus. |
| Chase | 1,285,560 | Gravity Fruit Separator. |
| Sias | 2,283,512 | Flotation Fruit Separator. |
| Rakowsky | 2,879,889 | Apparatus for Separating Mixed Products Having Specific Gravities Less Than One. |

Sink/float or other specific gravity-based sorting techniques have been disclosed for separating pitted from unpitted cherries and cherries by grade (U.S. Pat. 2,300,777), pitted from unpitted cherries and olives (U.S. Pat. 2,359,414), potatoes and other root crops by starch content (U.S. Pat. 2,426,398) and thick skinned from thin skinned citrus fruit (U.S. Pat. 3,031,081).

FURTHER BACKGROUND OF THE INVENTION

In one instance known to the inventor, as an example of manual sorting manpower requirements, 30⅝-bushel baskets of tomatoes are sorted per minute at a weight of about 32 pounds per basket. This requires the full services of about 36 people, in two shifts a day, six days a week during the period of about Aug. 10 to Oct. 1, the picking season in that area.

A sink/float system for mass sorting tomatoes, by maturity class and quality grade, for instance tomatoes which have been machine harvested, using a series of tanks of fluid of successively increasing or decreasing density, all no greater than S.G.=1, has been developed by Ahmed A. Kattan. As is now known from the work of Kattan, the degree of brightness and degree of maturity of tomatoes are well correlated with their specific gravity; that as a tomato becomes riper, it also gains in relative density; that within individuals of a variety, the greener tomatoes are less dense than the redder tomatoes.

When machine harvesting is employed, best management of equipment and personnel suggests the scaling of sorting equipment to accept the product of a simple multiple of harvesters, for instance, one sorter for each harvester or one half sorter for each harvester. It should be apparent that the greater the bulk and weight of fruit a harvesting machine produces per unit time, the less likely it will be that a series-of-tanks, sink/float system can be designed to handle the product of one harvesting machine without unacceptable damage to the fruit, unacceptable cost and unacceptable reliability of sorting due, among other factors, to turbulence of the flotation media.

Accordingly, especially for use in conjunction with need for rapid, economical, reliable sorting of a relatively great number and bulk of incoming fruits, for instance, picked by high volume automated harvesting apparatus, there exists a need for means and a method for dynamic sorting. By "dynamic sorting" it is meant that the fruits are classified while individuals of the fruits are moving absolutely, and while they are moving relative to one another through a buoyant fluid medium.

As can be reasonably expected in any field of technology, others have addressed the same or similar problems as that addressed by the present inventor. However, the continued use of hand sorting of fruits in an age of a shrinking pool of labor economically available for such a task should be seen as ample evidence that sorting devices currently commercially available fall short of broad market acceptance.

Exemplary of the backdrop against which the hydrodynamic sorting system described herein may be seen as an improvement so far as rapid, reliable economical sorting of fruits by specific gravity groups is concerned, are the following United States patents:

| Patentee | Number | Title |
|---|---|---|
| Parker | 1,252,833 | Gravity Fruit Separating Apparatus. |
| Jackson | 1,295,172 | Fruit Separator. |
| Thorold | 2,109,121 | Method and Apparatus for Grading Particles Differing in Specific Gravity. |
| Pixton | 2,234,502 | Method and Apparatus for Separating Frosted Fruit. |
| Sias | 2,283,512 | Flotation Fruit Separtor. |
| Belk | 3,031,081 | Apparatus for Separating Thick Skinned Citrus Fruit From Thin Skinned Citrus Fruit. |

SUMMARY OF THE INVENTION

In its manifestation which at present appears to be most practical, in practicing the invention for introducing articles into a container of liquid in which many of the articles will become suspended or float, the container is provided with a J-shaped inlet chute having its shorter leg opening through the bottom of the container. The longer leg of the chute extends above the level of liquid and below that level is provided with an aerator which produces an air/liquid slurry within the longer leg. This slurry has a lower specific gravity than the liquid alone, so articles dropped into the longer leg of the chute fall gently downwardly through the slurry, then bob upwardly in the chute shorter leg, through the container bottom opening and into the container. By preference, fluid jets are provided in the chute below the aerator to gently transfer the articles from the longer leg to the shorter leg of the chute. Thus the articles, such as fruits of mixed maturity, are released from below the upper surface, into a moving stream of flotation liquid. Baffle screens transversely separate the flotation liquid upper surface into collection areas downstream of the release point. The articles (fruits) upon rising in relation to their specific gravity are trapped within the collection areas. In each collection area, the trapped articles (fruits) are hauled-off by collection devices. Preferably, each of the collection devices is capable of accepting a majority of the articles being released into the flotation liquid should a majority of the articles enter one collection area.

In this system, the sink-float principle is not of prime importance, although some debris or overripe articles may be recovered as sinkers; instead, the dependence upon specific gravity of the distance to rise of articles impelled from a common, submerged point in a buoyant fluid medium.

Specific gravity of the articles is the dominant factor influencing behavior of the articles during separation, because of the low buoyant liquid velocities and viscosities. Thus, the system is reasonably independent of size and shape of the incoming articles. This is aided, of course, by any sizing presorts (undersize rejection), such as are performed on the automatic tomato harvesting machine discussed above.

The number of collection areas is, within reason, open to the decision of practitioners of the method of sorting disclosed herein. When mass sorting machine harvested tomatoes, a first classification which may be done, using the process and apparatus in or near the field being harvested, could for instance, include three collection areas or zones, separating the harvested tomatoes, into those too green to use, those which are sufficiently ripe to be used by tomato processors as input for their operations and those which are too ripe to use.

Tomato processors may also profitably use the process and apparatus of the invention on the sufficiently ripe tomatoes forwarded to them from the second classification, to separate these tomatoes into quality grades in order to make best economic use of their supply of tomatoes.

Thus, the tomatoes, or other fruit, may be rapidly sorted without ever having to be handled individually in series.

BRIEF DESCRIPTION OF THE DRAWINGS

The principles of the invention will be further hereinafter discussed with reference to the drawings wherein preferred embodiments are shown. The specifics illustrated in the drawings are intended to exemplify, rather than limit, aspects of the invention as defined in the claims.

DETAILED DESCRIPTION OF PREFERRED EMBODIMENTS

Figures 1, 2, 3, 4:
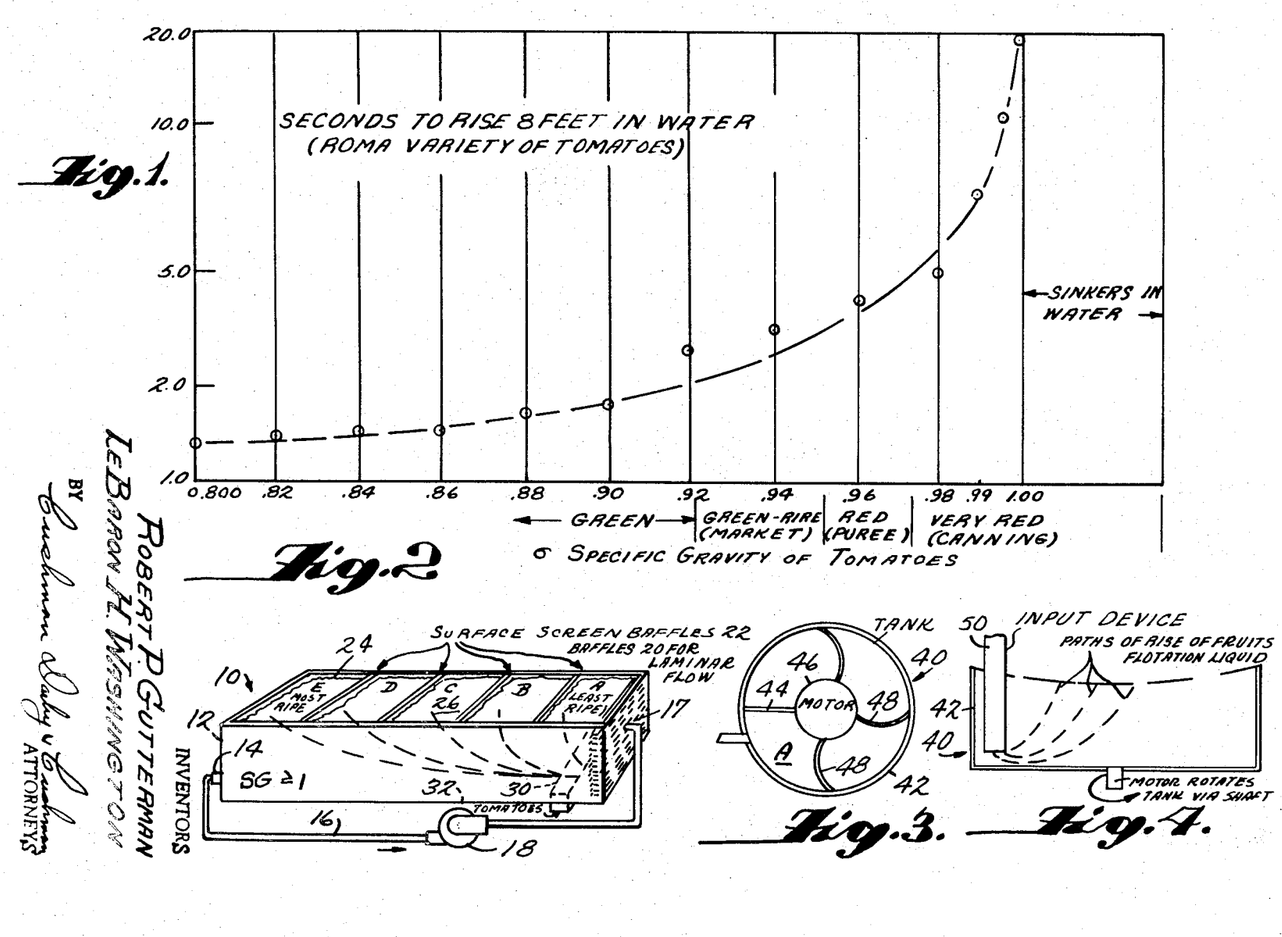
FIG. 1 is a graphical representation of the number of seconds required by tomatoes of the Roma variety to rise eight feet in water, aaginst the specific gravities of the tomatoes. Ripeness categories corresponding to the specific gravities are also indicated along the horizontal scale.
FIG. 2 is a schematic view of apparatus for hydrodynamic sorting of fruits.
FIG. 3 is a top plan view, somewhat schematically, of modified apparatus for carrying out hydrodynamic sorting.
FIG. 4 is a schematic side elevation view of the equipment of FIG. 3 and generally illustrating one form of input device.

In FIG. 1, there is shown a plot of the number of seconds required for tomatoes of the Roma variety and of differing ripeness (specific gravity) to rise eight feet in quiescent water. The break down adjacent the lower border of the graph indicates the correlation of density of the tomatoes and degree of ripeness of the tomatoes. From the plot it should be apparent that most of the tomatoes which will rise in water, if of a normal ripeness distribution, will rise a significant distance within less than seven seconds. Accordingly, if the tomatoes are allowed to rise from an introduction point at a fixed distance below the upper surface of a body of flotation fluid having substantially laminar flow with dominant horizontal velocity component, the tomatoes will rise along physically separated paths, of differing length along the flow of the flotation fluid, with those of least density relative to that of the fluid rising furthest upstream.

The acceleration of fruit rising in a flotation medium tends to follow the equations:

$$a = \left[ \frac{\rho - \sigma}{\sigma + \frac{1}{2}\rho} \right] g \quad (1)$$

$$s = \frac{1}{2} a t^2 \quad (2)$$

and
wherein:

$a$=acceleration of the fruit
$\rho$=density of the flotation fluid
$\sigma$=density of the fruit
$g$=acceleration due to gravitational forces
$s$=distance along path of rise
$t$=time Using as an instance a rise of eight feet ($s=8$) along a vertical path where $g=32$ feet/sec.$^2$, in water having a density of $\rho=1.0$ and combining Equations 1 and 2 the following simplification may be made:

$$T = \sqrt{\frac{\sigma - 0.5}{2 - 2\sigma}} \quad (3)$$

which expresses the time, in seconds, needed for a generally spherical fruit of density less than 1.0 to rise eight feet in water.

In rising in a fluid, it has been found that fruit will roughly follow Stokes law, commonly expressed as:

$$V_T = \frac{2}{9} \left( \frac{\sigma - \rho}{\mu} \right) r^2 g \quad (4)$$

wherein:

$V_T$=terminal velocity
$\sigma$=density of the fruit
$\rho$=density of the flotation fluid
$\mu$=absolute viscosity of the flotation fluid
$r$=radius of the fruit and
$g$=acceleration due to earth's gravity all in consistent units.

Accordingly, the apparatus hereinafter described provides means for release of fruits from an introduction point at a fixed distance below the upper surface of a body of flotation fluid having a substantially laminar flow with a predominant horizontal velocity component; and means for collecting those fruits which tend to rise from segments of the flow path of the fluid spaced longitudinally along said flow path.

After some reflection, it will be seen that the flotation fluid to be used for classifying fruits of a variety should be one in which the bulk of such fruits will tend to rise a significant distance within a sufficiently short time that a container of manageable, economical size can be used together with a flotation fluid horizontal velocity which need not be so great that maintenance of substantially laminar flow could not be achieved. It should also be apparent that while laminar flow is easier to achieve with increase of depth of fluid, pumping requirements increase, so that a balance must be struck.

In practice of the invention upon tomatoes, water or water plus brine or ethyl alcohol has been chosen as preferred flotation fluid. The choice of fluid was influenced by the criteria just set forth, including the fact that the bulk of tomatoes tend to rise in water. This medium is generally readily available, can be safely used in contact with fresh fruit, has so reasonably low a viscosity as to be pumpable at the velocities needed without great cost, and other desirable attributes which should now suggest themselves. For instance, the lowness of viscosity makes water and brine, as media, relatively insensitive to shape factor, i.e., to lack of ideal roundness or sphericity in the fruit being sorted.

In the simple system 10 shown in FIG. 2, an upwardly open, generally rectangular tank 12 contains a body of flotation fluid, for instance, water having a specific gravity of at least 1.0. At the left end of the tank a water outlet 14 is provided which recirculates withdrawn water, through the conduit 16, back to an inlet 17 at the right end of the tank, with the aid of a pump 18. A right to left flow of flotation fluid with a predominating horizontal velocity component is impressed with a substantially laminar flow character through the use of baffle plates 20 spaced across the tank just downstream of, and in the path of, fluid issuing from the inlet 17.

A plurality of vertically short baffles 22 (four are shown) are positioned transversely across the full width of the tank at the top, each dipping below the upper level 24 of the flotation fluid 26. The baffles 22 may consist of strips of netting or screening. The simple device 10 is completed by means 28 for introducing fruit into the tank from a point downstream of the laminar flow inducing baffle plates 20 and at a fixed distance below the upper surface of the flotation fluid. The means 28 is depicted as comprising a port 30 opening through the tank bottom 32. In practice, a novel article input device such as is shown is preferred.

In use of the device 10, fruit, for instance tomatoes, released into the tank through the input device opening 30 begin to rise due to the buoying effect of the medium 26. The tomatoes also begin to acquire a leftward velocity due to the horizontal leftward flow of the medium 26. Those tomatoes whose density is more lower than water are most buoyed by the water and bob to the surface before they have been carried very far downstram, becoming trapped within area A whose downstream limit is defined by the upstream side of the first baffle 22 from the right.

("Left" and "right" as used herein refer to the apparatus as depicted in the particular figure being discussed and not to any underlying orientational necessity.)

Those tomatoes whose density is less lower than water than those collected within area A are carried further downstream before they rise into a respective segregated collection area B, C, D, or E.

Tomatoes which have risen into collecting areas A-E may be skimmed off using suitable apparatus ranging from humans hands—through manually operated rakes—to conveyors, for instance such as are shown in the U.S. Pat. of Tromp, No. 2,603,352.

The curves (shown dashed in FIG. 2) followed by the rising fruit are generally observed in fact, and reinforce the indication that Equations 1, 2, 3 and 4 above are applicable.

For a tank 12 about 2-3 feet deep and about 10-15 feet long, a flotation fluid horizontal velocity of about 2-3 feet per second would be adequate to produce the desired separation.

An interesting occurrence helps illustrate an unexpected result obtained when practicing the invention. In a particular mass sorting test performed on tomatoes, it was noted that some fruit which would have passed a visual "ripeness" test and would likely have been hand-sorted into an "acceptable for processing" grade, were mass-sorted into the green, unacceptable tomato fraction. These seemingly "ripe" tomatoes, upon being sliced open, were found to actually be diseased with "wood heart" disease, which would make them unacceptable for canning in spite of their good exterior appearance. They were mass sorted into the "green" fraction because of their disease-caused low specific gravity.

Although a long rectangular tank as shown in FIG. 2 is a feasible embodiment, it requires a relatively high energy input for pumping of water and the water is usefully employed during only half of its path of travel, i.e., when travelling from right to left in the tank and not when returning from left to right in the conduit 16.

Accordingly, as an alternative, two identical sorters 10 can be placed side-by-side and connected with semi-annular end sections. Then, by a simple paddle wheel, or other fluid pump, the flotation medium can be maintained in circulation about the whole oval or "race track" configuration producing separations in both sorters 10.

Another embodiment 40 is shown in FIGS. 3 and 4 wherein an annular tank 42 is provided. A vane 44 is rotated slowly (for instance, about 2-3 feet per second) around the tank by the motor 46. Because of the tendency of the flotation medium to remain in motion circularly of the tank, the horsepower requirements for circulating the flotation medium are quite low. For instance, a 5 horsepower motor will adequately provide 2-3 feet per second circulation for brine in a tank 42 having an outside diameter of 14 feet and an inside diameter of 9 feet.

Baffle screens 48, spaced about the top of the tank, depend at least to the level of or even an inch or 2 below the upper surface of the flotation medium. The screens are arced, as seen in plan, in general correspondence to the profile of flotation fluid velocity in the tank.

Tomatoes are injected into the tank 42 from a fixed level at or near the bottom via an input device 50. Again, the least ripe, most buoyant tomatoes rise fastest after least travel angularly of the tank and are collected in area A on the upstream side of the first baffle screen 48. More ripe, less buoyant tomatoes rise more slowly after more travel angularly of the tank and are collected in the areas downstream of area A according to bands of relative density.

The annular tank has compactness as an asset, making field use of mass sorting, for instance by mounting the tank on the back of a truck, more feasible.

As an alternative to use of a vane to rotate the flotation medium relative to the annular tank 42, the motor could be used to rotate the whole tank relative to a stationary input device depending into the tank. Of course, this alternative would complicate the placement of the collecting area separating baffles.

In its preferred form, the article input device of the invention makes possible a continuous-flow mass-sorting machine design in which the tomatoes to be sorted are transferred only twice: once by a mechanical conveyor into a purely hydraulic input system, and once from the surface of a tank of brine, using a mechanical output conveyor. A separate output conveyor is provided for each separated grade of tomatoes.

The new system employs a single body of fluid to accomplish the entire sorting action. The fluid is a simple brine solution having its specific gravity adjusted and maintained so that the most mature acceptable tomatoes introduced will just barely float, while the greener fruit float more and more readily with decreasing maturity; i.e. as the difference between their specific gravity and that of the fluid increases.

With the flotation conditions adjusted as above, a large number of tomatoes of all grades of maturity may be released simultaneously at or through a port at the bottom of a tank containing the fluid. All of the fruit will float toward the surface, but the greener fruit of low specific gravity will rise much more rapidly than the more mature fruit of lower specific gravity.

The fluid of the flotation system described above may be contained in a channel, rather than a closed tank, and be caused to flow horizontally, at a constant velocity.

An unsorted mixture of tomatoes introduced through a fixed aperture in the bottom of the channel will then float downstream as well as toward the surface. When this is done, the most mature tomatoes will reach the stream surface at a point furthest downstream from the release point and the least mature will reach the surface at a point nearest to the release point. The intervening grades of relative maturity will proportionately reach the surface in a continuous spectrum. This spectrum theoretically may then be separated mechanically into as many zones of maturity as desired and the product skimmed separately from the surface of each zone to complete the sorting action.

The ideal situation for sorting occurs when all of the fruit introduced are of about the same average diameter. A very small fruit will rise to the surface somewhat more slowly than a large one of the same specific gravity. Therefore, the accuracy of the sort will be improved if very small fruit are screened out at the harvester or at some other point prior to sorting. This will reduce the appearance of occasional very small green fruit among the normal size fruit of more advanced maturity.

An important extra value of the specific gravity mass sorting system arises from the fact that many non-acceptable defects of otherwise mature tomatoes tend to produce internal cavities filled with gas or air. Defects of this type include worm-holes, porous surface cracks, immature core material inside a fruit with mature-appearing skin color, etc. Most of such defects drastically reduce the specific gravity of relatively mature fruit, causing it to be sorted out and removed with the green fruit.

Broken fruit that are so severely damaged as to lose their characteristic shape tend to experience excessive drag forces in floating toward the channel surface. Therefore, such fruit, together with many over-ripe fruit, tend to float to the surface very slowly and may be sorted out at the extreme downstream end of the sorting channel. In the practical embodiment of the apparatus it has been found useful to provide an end conveyor which screens and scavenges the entire depth of the sorting channel to remove such broken and over-ripe fruit and any trash of varying specific gravity which reaches the useful end of the sorting channel at any depth.

Attention should be drawn to the relationship between total solids and viscosity of the canned product as a function of density and maturity in the several tomato varieties studied in the abovementioned work of Kattan. Total solids increase with specific gravity, uniformly. However, viscosity comes to a broad peak in the middle of the specific gravity range, slightly for some varieties and more sharply for others. This observation may be of interest in controlling both the viscosity and the solids content of finished product by appropriate adjustment of the sorting system.

Figures 5, 6:
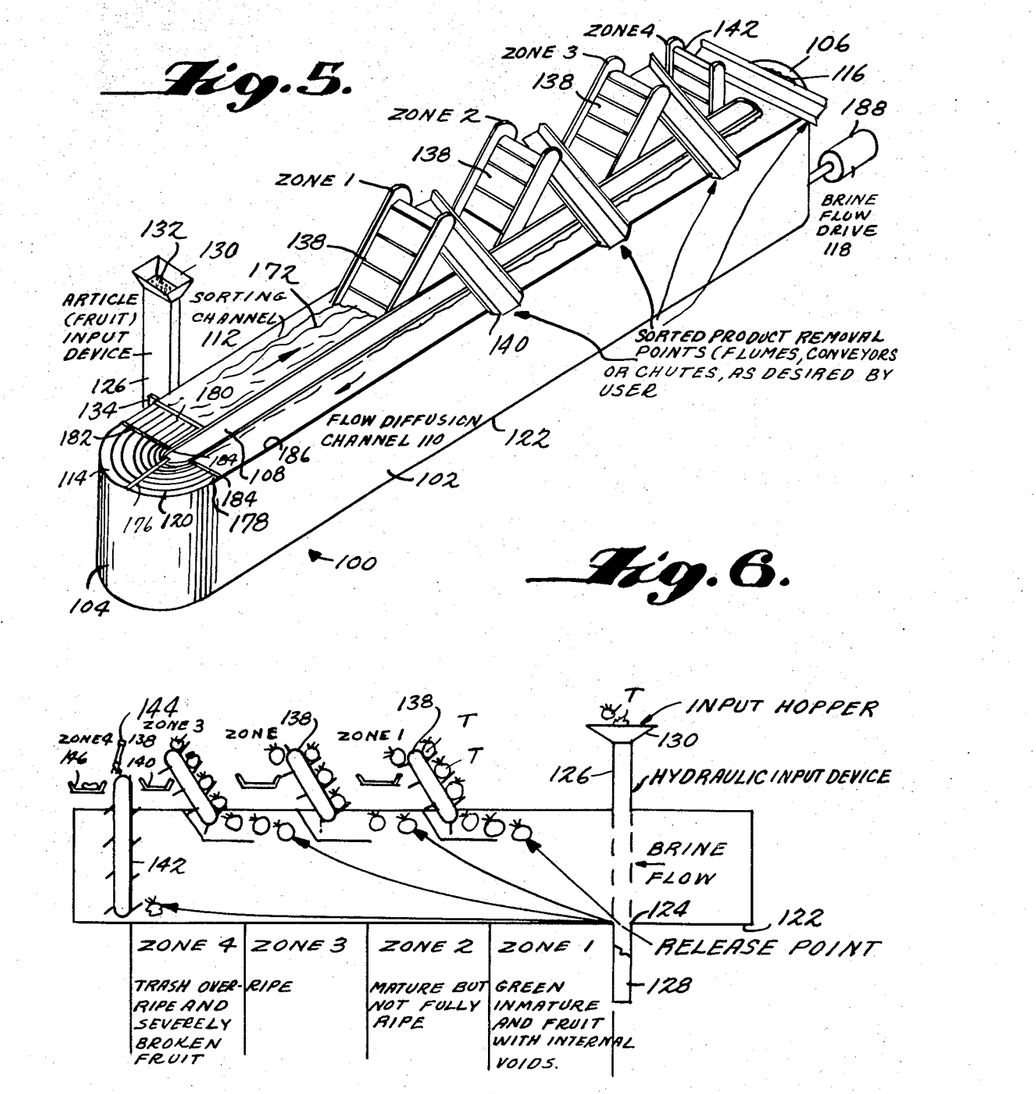
FIG. 5 is a perspective, somewhat schematic view of presently preferred apparatus for introducing articles into liquid container apparatus in accordance with principles of the invention.
FIG. 6 is a schematic side elevation view of the sorting channel side of the apparatus of FIG. 5, the outline only of the sorting tank being indicated in broken lines.

With references to FIGS. 5 and 6, the body of the apparatus 100 comprises an elongated coated or stainless steel tank 102 preferably containing brine of the chosen specific gravity. The tank 102 could be made of other materials such as wood, rubber, fiber glass, and the like. The tank is of rectangular cross section and fitted with semicircular ends 104, 106. A brine-filled "island" 108 of depth equal to that of the tank, of similar shape but more narrow and short, divides the tank into two flow channels 110, 112 connected at the ends by curved turning channels 114, 116. The more narrow channel 110 contains a variable speed brine flow drive system 118 which causes the brine to circulate continuously at a constant speed selected and controlled by the machine operator. The brine flow drive and the narrow flow diffusion channel 110 are designed to produce a constant velocity of flow having a very uniform velocity distribution as the flow is turned by a vane system 120 and enters the wide sorting channel 112.

The article input device

At the beginning of the sorting channel 112 the tank bottom 122 is pierced for almost the full width of the channel by a rectangular opening 124 through which the unsorted input stream of fruit, e.g. tomatoes is released into the sorting channel. This is accomplished by means of a novel hydraulic input conveyor 126.

The hydraulic input conveyor 126 (FIGS. 13–16) is a vertical chute supported to the outside of the tank 102 and having a height greater than that of the tank fluid level. The cross-section area and shape of the chute are preferably the same as that of the input aperture 124 in the bottom of the sorting channel 112. The chute 126 is connected to the input aperture 124 by means of an elbow connection 128 of appropriate cross-section, partially supported underneath the tank.

In order to cause tomatoes dropped into the input hopper 130 of the input device 126 to be conveyed to the bottom of the sorting channel, the input conveyor chute 126 is kept filled with a slurry 132 of very fine air bubbles produced by applying compressed air to suitable bubble diffusers 134 attached near the bottom of the chute. The air flow is adjusted to provide an apparent specific gravity, in the chute fluid only, sufficiently low to cause all of the introduced tomatoes to sink downward at a controlled and cushioned velocity.

At the bottom of the chute, a series of brine jets 136 engage the bottom layers of the sinking tomatoes and transfer them sideways through the elbow where they are free to float upward through the aperture and become engaged by the flowing brine in the sorting channel 112.

As indicated in the drawings, the tomatoes then move downstream with the same velocity as the brine. Each tomato floats upward at a velocity proportioned to the difference between its specific gravity and that of the brine. The most dense, and therefore the most mature tomatoes are carried the greatest distance downstream before approaching the brine surface.

Figure 9:
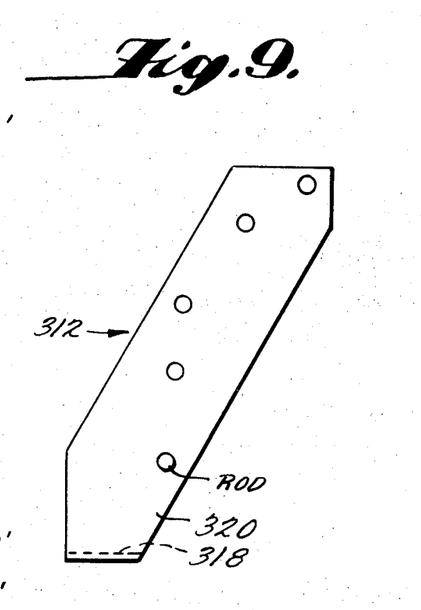
FIG. 9 is a side elevation view of one flight for the conveyor of FIG. 8.
Figure 10:
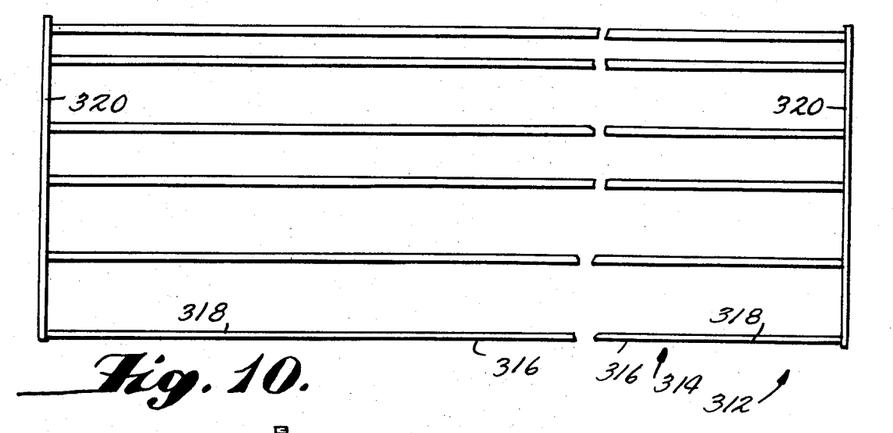
FIG. 10 is a front elevation view of flight of the conveyor of FIG. 9.

A total of four sorting zones are provided in the preferred embodiment 100 as shown. The first three zones are equipped with skimming conveyors 138 which elevate the sorted product from the brine surface and transfer it to the user's product removal system 140 by gravity release above the sorting channel surface. The relative positions of the three skimming conveyors 138 (FIGS. 8–10) along the sorting channel 112 length are manually adjustable by the machine operator to suit requirements of the product being sorted and the desired end use.

The fourth conveyor 142 (FIG. 11) is a moving screen type which scavenges the entire brine flow at the end of the sorting channel to remove over-ripe and broken fruit, together with severely broken fruit and sundry gross trash which may enter the system and float as far as the end conveyor. The end conveyor is fitted with a freshwater jet system 144 (FIG. 6) to transfer its contents to the user's disposal system 146.

Figures 7, 12:
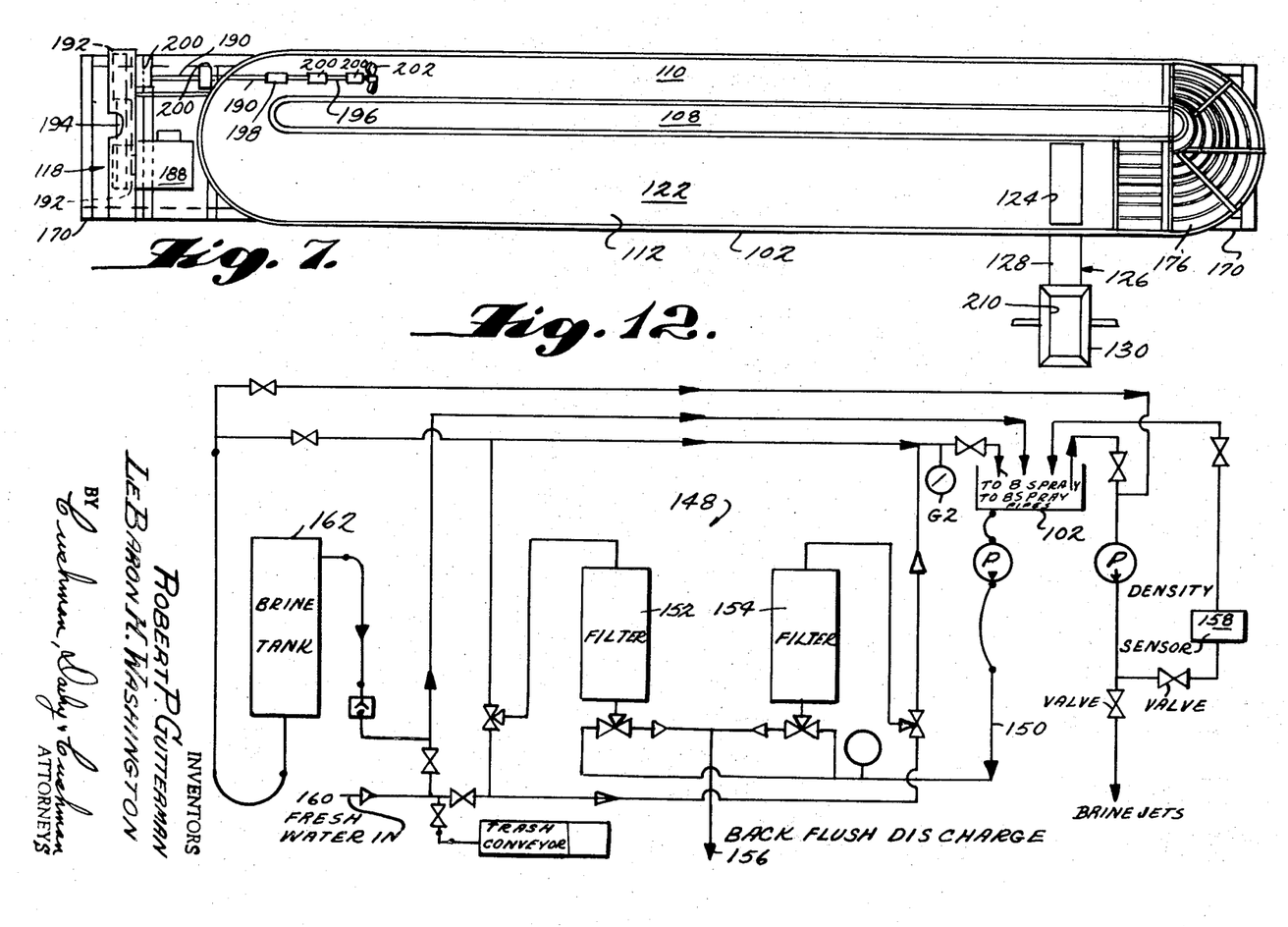
FIG. 7 is a more detailed top plan view of the apparatus of FIGS. 5 and 6, with the conveyors and chutes being omitted in this figure in order to allow clearer illustration of other components.
FIG. 12 is a schematic diagram illustrating a typical interconnection of fluid flow path elements of the illustrated apparatus.

With reference to FIG. 12 a brine filtering system 148 is preferably included as part of the machine 100. In this system a portion 150 of the brine is filtered continuously to remove particles smaller than will be retained on the end conveyor. The particular filter system is not usually designed to remove particles of dirt and mud although this is certainly a possibility. Accordingly, the product introduced for sorting should be washed beforehand. The filter system 148 contains two units 152, 154, one being back-washed to the user's drain 156 with fresh water while the other is filtering. Switching from one filter to the other is controlled by a program timer automatically. The time base is manually adjustable according to the rate of dirt input to the tank.

Specific gravity of the system brine is continuously measured at 158 and controlled automatically to match a set-point established by the machine operator. Make-up is provided by combining fresh water at 160 and concentrated brine from an auxiliary brine-maker 162. The brine flow velocity is preferably automatically indicated to and controlled by the operator.

The three important process variables of the mass sorting system are: the brine specific gravity, the brine flow velocity, and the output conveyor positions along the sorting channel.

The more nearly the brine specific gravity is lowered toward that of the most mature acceptable tomatoes of the variety being sorted, the more widely the sorting spectrum will be stretched along the length of the sorting channel.

Increasing the brine flow velocity will stretch the entire spectrum and move it downstream. Lowering the brine flow velocity will shorten the spectrum and move it upstream. Thus, the operator may choose to emphasize separation of fine grades of relative maturity at either end of the spectrum.

Output conveyor positions need not be varied frequently once the appropriate positions are found for a given tomato variety. An occurrence requiring such a change might be a shift from sorting globe tomatoes of the VF-145 type to Roma or other paste types.

The production rate that can be achieved using the mass sorting system of FIGS. 5–16 for tomatoes will depend on a number of factors. Among these are the variety of tomatoes being sorted, the ratio of immature to mature fruit, the average specific gravity of the fruit, the specific gravity setting of the brine, the percentage of severely damaged fruit, and the amount of any foreign matter introduced with the tomatoes. The hydraulic input conveyor system in the preferred embodiment illustrated has a design capacity of 8 to 10 pounds of tomatoes per second, or about 15 tons per hour. While the hydraulic input conveyor has a theoretical surge tolerance somewhat in excess of the design pounds per second rate, it will perform in optimum fashion if the input flow of tomatoes is maintained at a constant rate, without high peak surges on either a short or long term basis. Each of the three output conveyors should have a minimum capacity of 60% of the entire design input flow. Thus, the actual output achieved by each individual output conveyor will depend on the product mix and the operator's selection of appropriate conveyor positions along the sorting channel.

The principles of the apparatus may be further understood from the following tabulation of characteristics of the presently preferred embodiment, which should be understood as illustrative.

TABLE I

Characteristics of the particular embodiment illustrated in FIGS. 5–16

Dimensions: 35 feet long, 6 feet 9 inches wide, 10 feet high
Clearance required:
    Length—3 feet each end
    Width—3 feet each side
    Height—4 feet over machine
Tank volume: 3,500 gallons
Electrical power:
    220 volts, 3 phase, 40 amps
    440 volts, 3 phase, 30 amps
    115 volts, 1 phase, 60 amps, 60 cycle
Electrical system: Waterproof throughout
Fresh water pressurized supply:
    Pressure—60–100 p.s.i.
    Line size—1 inch
    Flow rate—100–150 g.p.m.
Weight:
    Empty—8,200 pounds
    Full—38,000 pounds
Filtering: Continuous recirculation loop at 50 g.p.m. through stainless steel mesh removing 98% of the particles larger than 300 microns. Dual path system.
Specific gravity control: Continuous monitoring of recirculation loop. Continuous indication and automatic control. Limits S.G.=1.000 and S.G.=1.100 accuracy ±.002 S.G.
Electric motors: Totally enclosed throughout.
Conveyors: Stainless steel construction. Emergency stop control on each unit for personnel safety.

FURTHER EXEMPLARY DETAILS OF PREFERRED EMBODIMENT

The tank 102 of this example is 25 feet long, 4 feet wide and 4 feet high. It is mounted on a steel channel frame 170. The depth of brine 172 in the tank is normally maintained at 46 inches with the haul-off conveyors 138 dipping into the solution 172 a depth equal to the height of their lower sprockets, i.e. so the lower sprockets are tangent to the brine surface, about four inches plus the length of the conveyor fingers.

The brine 172 in the tank is generally maintained at a specific gravity of 1.02–1.05 depending upon the separation being made, as above described. "Purex" granulated salt of a grade approved for use in contact with food stuffs is exemplary of the solute.

Within the sorting channel the brine is propelled along at an average velocity of about 1–2 feet per second.

Automatically operable devices 158 for monitoring and maintaining specific gravities of brine solutions are commercially available. One preferred for use in the present system is a Halliburton densometer used in conjunction with a Taylor Instrument Company Pneumatic Indicating Controller, which is a balance based device designed to automatically maintain the specific gravity of a solution to within .25 percent of a selected value, for flow rates up to 50 gallons per minute.

The vane system 120 where the narrow flow diffusion channel turns and the wider sorting channel begins is shown comprising seven vertical vanes 176 generally evenly spaced from one another and undergoing a gradual spread from one inch separation at their upstream ends 178 to two inch separation at their downstream ends 180. Thus the bend radii for the 180 degree bends of the vanes 176 are, from the tightest, $7^{45}/_{64}$ inches, $10^{1}/_{32}$ inches, $12^{23}/_{64}$ inches, $14^{11}/_{16}$ inches, $17^{1}/_{64}$ inches, $19^{11}/_{32}$ inches and $21^{43}/_{64}$ inches. The vanes are typically $48^{1}/_{8}$ inches high, made of $1/_{16}$ inch thick stainless steel sheet. The vanes are held in the disposition illustrated by radially or laterally extending aluminum alloy cross bars 182 tack welded to all the sheets at the upper and lower edges of the sheets. The ends of the lower bars 182 are laterally flush with the radially outer and radially inner sheets, but the upper cross bars 182 extend therebeyond to provide supports 184 via which the vane assembly rests upon the upper edges 186 of the tank sidewalls.

The brine flow drive system 118 is shown including an electric motor 188, typically General Electric model 4813, a 10 H.P., 1800 r.p.m. electric motor. Power is transmitted from the output shaft of the motor 188 to a pulley shaft 190 via variable speed sheeves 192 connected by an endless belt 194. The pulley shaft 190 is axially coupled to a propeller drive shaft 196 at 198, the two shafts being supported in bearings 200. The propeller shaft is fitted with a variable pitch propeller 202, typically a Lesnor-Maehr Marine Co. multi-pitch propeller, model #WB–1.

The article input device of the present invention

The article input device 126 is shown including a hopper 130 into which the fruit to be sorted may be poured. The hopper 130 is disposed beside the tank 102 at the beginning of the sorting channel 112 immediately downstream of the trailing ends of the vanes 176. The hopper 130 is shown having the shape of an inverted frustum of a rectangular based pyramid so as to have a regular transition with the upper end of a chute 210 of rectangular transverse section. The chute 210 is generally J-shaped as seen in elevation looking lengthwise of the tank 102, so that the hopper is mounted at the top of the longer arm 212 and the upwardly opening 214 end of the shorter arm 216 is communicated via a rectangular opening 124 in the tank bottom 122. As before stated, the opening 124 extends substantially the full width of the sorting channel 112. Typically, the size of the opening 124 is 6 inches lengthwise of the sorting channel by 16 inches widthwise of the sorting channel. Brackets 218 secure the input device to the tank and tank support frame. For manufacturing convenience the device 126 is made in two sections, the first 220 including the hopper and upper, straight segment of the longer arm 212 and the other 222 comprising a brief, lower portion of the longer arm, the shorter arm and the transitional region connecting the two arms. The sections 220 and 222 are connected during assembly via mating, bolt-receiving flanges 224.

Rather than being merely regularly rectilinear or merely curvilinear in the region between the arms 212 and 216, the chute is preferably configured along the following lines, the specific figures being given by way of illustration: 6.125 inches down from the end 214 of the shorter arm on the inner side and 9 inches down from the end 214 on the outer side an oblique section 226 intersects the lower extent of the shorter arm and extends downwardly and toward subjacency with the longer arm of an angle of 120 degrees from the vertical. The thickness of the oblique section 226 along the line 228 is 10.5 inches. Five-sixths of the distance from the outer side of the longer arm toward the shorter arm and proceeding to the outer side of the longer arm, the transitional section is streamlined by having a bottom wall 230 oblique in the opposite sense to the lower wall of the oblique section 226. The bottom wall 230 extends at an angle of 135 degrees to the vertical and thus joins the lower wall of the oblique section 226 at an angle of 105 degrees. As the device portions adjacent the 105 degree angle constitute, when the input device 126 is installed, the lowest point of the tank and input device assembly, a cleanout is provided there at 232 for emptying of the tank and chute and for periodically allowing a small amount of solution to surge out, carrying out silt or trash which may have deposited there. Normally the outlet 232 is closed by a valve.

It should now be noticed that the oblique section 226, upper wall 234, lower end 235, which joins the lower end of the inner side 236 of the longer arm 212 lies about 3 9/16 inches below the lower end of the inner side 238 of the shorter arm 216.

Further it should be noticed that the front and rear faces 240, 242 of the longer arm 212 are each provided with a rectangular port 244, 246 whose lower edge generally coincides with the level of the lower end 235 of the oblique section 226. Each port 244, 246 as shown measures 6 1/16 inches high by 16 inches wide. Of greater importance, the ports should be understood as extending across substantially the full width of the arm 212 and down to the beginning of the transverse, oblique portion of the input device. Each port 244, 246 is shown provided with a peripheral bolt receiving flange 248 having appropriate fastener-receiving openings 250, for securement of an aerator assembly 252 in each port 244, 246. Each aerator assembly (FIGS. 16 and 17) includes an aerator plate 254 and an aerator manifold 256. The latter comprises a rectangular plate 258, for instance of steel, having bolt receiving openings 260 formed therethrough adjacent its outer periphery. The openings 260 correspond in positioning to the port flange openings 250 so the respective assemblies may be secured covering the respective ports 244, 246 for instance with bolts 262. Of course gasketing material may be interposed between the port flanges and plate 258 to cause the connection 250, 260, 262 to be leak-tight.

Figure 16:
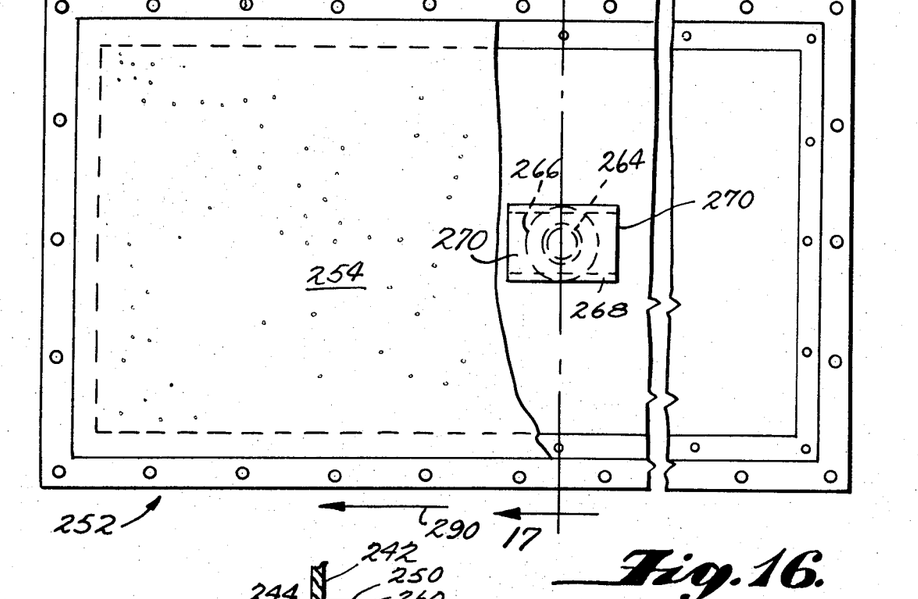
FIG. 16 is a rear elevation view of one of the aerator intake manifolds for the article input device in accordance with the principles of this invention.
Figure 17:
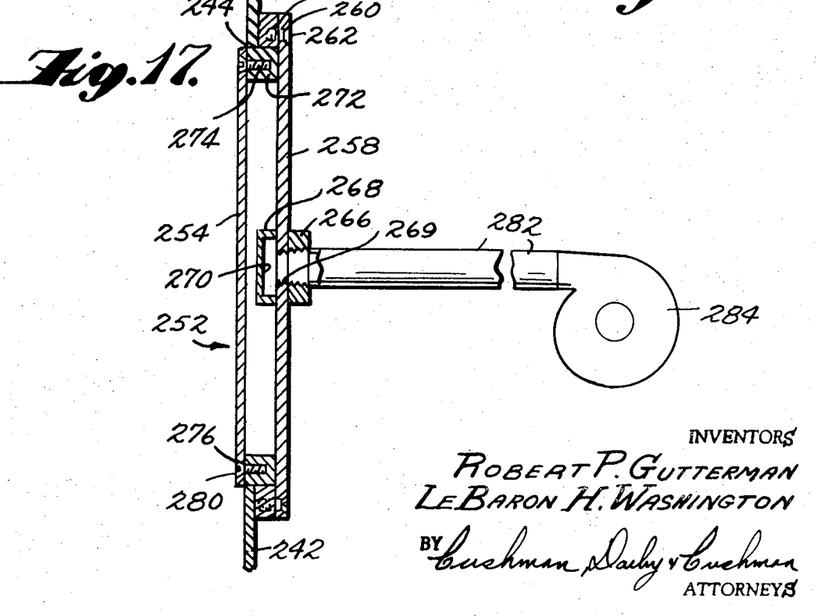
FIG. 17 is a sectional view taken substantially along line 17—17 of FIG. 16.

An opening 264 is formed through the plate 258. On its outside, an internally threaded pipe bushing 266 is secured to the plate surrounding the opening 264. On the inside, a baffle 268 of U-shaped transverse section bridges over the opening 264 so that compressed air supplied from the outside through the bushing 266 cannot blast straight ahead through the aerator 254 but issues normally to the aerator through the baffle outlets 270. Both the bushing 266 and baffle 268 are welded in place.

The manifold 256 further comprises a rectangular flange 272 welded on the inside thereof and being of such perimeter as to fit snugly through a respective one of the ports 244, 246. Bolt receiving sockets 274 are formed in the flange 272 so as to open toward the inside of the input device.

Each aerator plate 254 is shown comprising a rectangular plate of durable air-porous material. A preferred material is type 416 stainless steel having pores of a mean size of 2 microns. Perimetrically, the plates 254 are provided with bolt receiving openings 276 corresponding to the sockets 274 in the flange 272. By preference, the plates 254 are porous in their central regions extending out to just short of the bolt openings rectangle, and nonporous in the region of the bolt openings rectangle and outwardly thereof. The latter region may be formed nonporously or should it be more convenient to construct the aerator plates of material which is porous throughout, the borders may be doped to blind the pores.

Accordingly, before the manifolds are bolted in place, the aerator plates 258 are bolted to the manifolds with bolts 280.

The pipe bushings 266 are secured to pipes 282 connected to means for instance a compressor 284 for supplying gas, preferably air, under pressure. In the example, the compressor 284 is driven by a 1 horsepower motor and is capable of providing 3.6 s.c.f.m.

Figure 14:
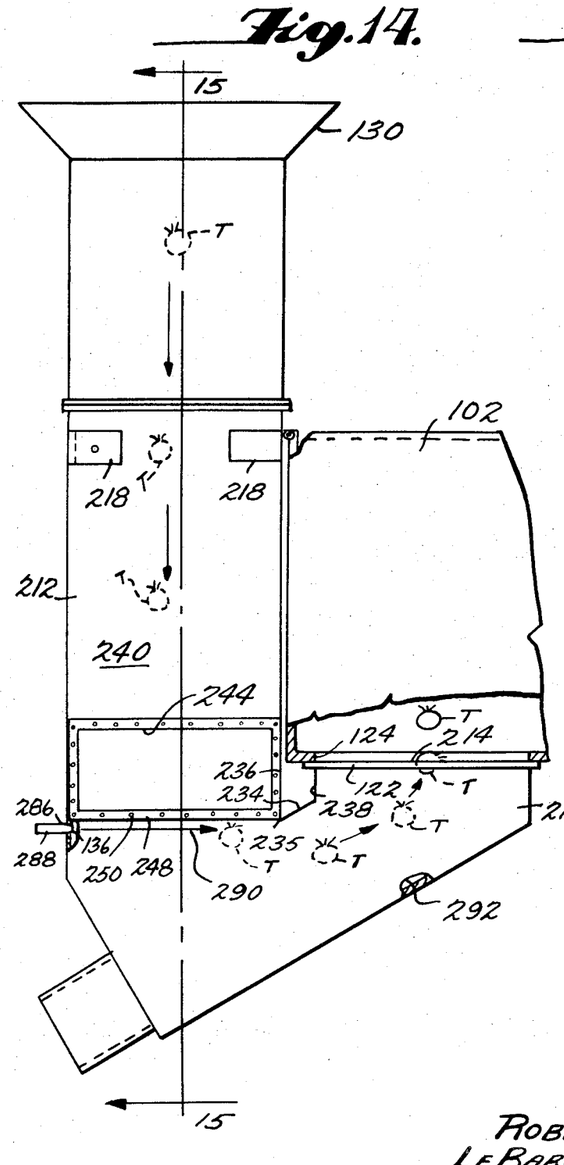
FIG. 14 is an end elevation thereof.
Figure 15:
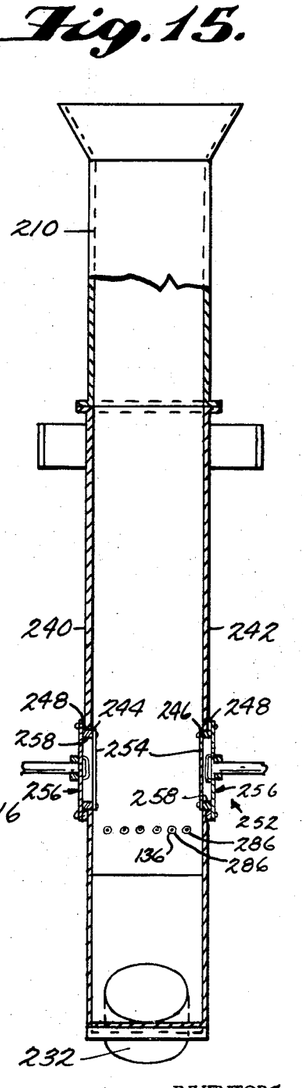
FIG. 15 is a sectional view taken substantially along line 15—15 of FIG. 14.

The fruit input device further includes at least one and preferably a plurality of openings 286 through the outer wall of the longer arm, just below the aerator assemblies. The openings 286 (FIG. 15) are connected to pipes 288 (FIG. 14) supplied with tank solution under such pressure that there is established in the input device a flow in the direction of the arrow 290 (FIG. 14).

With the sorting apparatus in operation, a brine solution of about 1.02–1.05 S.G. being circulated at about 1–2 feet per second in the tank and compressed air and brine solution being supplied to the fruit input device as aforesaid, there will be a steady state aerated solution in the longer arm of the input device, rising to a higher level than the level of solution in the sorting tank in view of its lower composite specific gravity (e.g. about 0.6–0.8). The jets 136 of unaerated solution issuing from the openings 286 together with the tendency of the aeration bubbles to rise tends to make the body of aerated solution coterminous with the lower extent of the aerator plates.

The fruit e.g. tomatoes T deposited in the fruit input device hopper, all have densities greater than that of the aerated solution and thus gently fall through the aerated solution. Upon reaching the body of unaerated solution at 292 lying below the aerated solution the fruit tend not to fall further, but under the influence of the current from the inlets 286 the fruit are impelled transversely and into the shorter arm of the fruit input device. Because the specific gravity of the solution within the shorter arm is greater than that of all of the input fruit (but perhaps for some silt and heavy trash which will settle in the cleanout trap) the fruit will all rise in the shorter arm 216 and bob up through the opening 124 in the tank bottom, into the circulating stream of sorting solution. Once in the stream of sorting solution the fruit tend to rise at more and less rapid rates depending upon their individual relative densities compared to that of the sorting solution. Since the solution itself is circulating the sorting tank the differential rate of rise of fruit spread into a spectrum lengthwise of the tank sorting channel. The fruit whose density is the most lighter than that of the sorting solution rise most rapidly and thus are not carried very far downstream before they have neared the upper level of the sorting solution. The fruit whose density is less than that of the sorting solution but close to that of the sorting solution rise more slowly and thus are carried further downstream before they near the upper level of the sorting solution.

Although different techniques and apparatus could be used to remove the dynamically separated fruits from the circuiting sorting solution, the presently preferred apparatus comprises at least one skimming conveyor 138 and an end conveyor 142. In the apparatus illustrated, four sorting zones are provided by three skimming conveyors 138 spaced longitudinally of the sorting channel and adjusted to dip a short distance (for instance 4–6 inches) into the sorting solution, and an end conveyor 142 positioned at the downstream end of the sorting channel and adjusted to scavenge the entire depth of the sorting solution.

Figure 8:
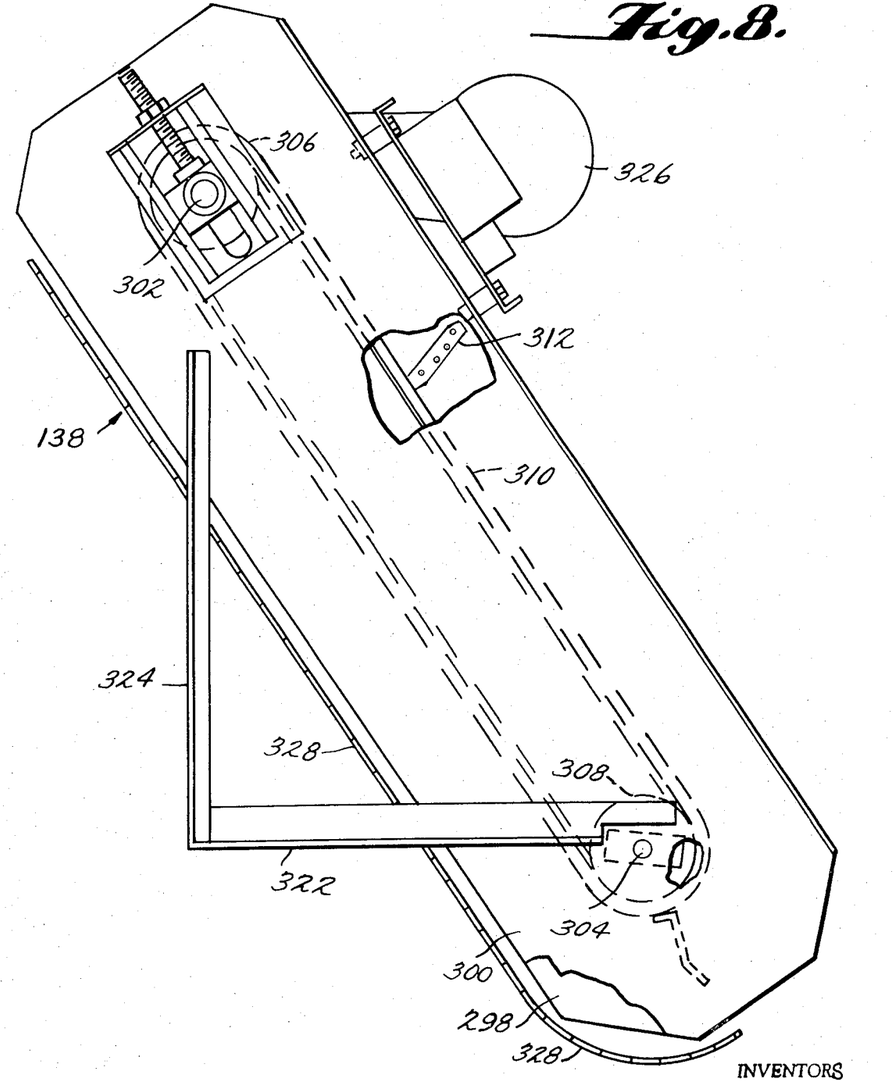
FIG. 8 is a side elevation view of one of the conveyors for sorted fruits.

Each skimming conveyor 138 is shown including a frame having opposite side plates 298, 300 journalling upper and lower transversely extending shafts 302, 304 between them. The shafts 302, 304 mount sprockets 306, 308 about which an endless wire mesh belt 310 is entrained. The sprockets 306, 308 are of sufficiently small diameter relative to the widths of the side plates 298, 300 that the latter prevent sorted collected fruit from falling laterally off the conveyor belt while being lifted.

The mesh belt 310 is provided with a plurality of transversely extending flights 312 (FIGS. 9 and 10) spaced longitudinally of the belt and projecting outwardly thereof. Two factors are of prime consideration in the design of the conveyor belts, including the flights. Firstly, the less sorting solution they lift with the sorted fruit, the better; and secondly, if they skewer or bruise much of the sorted fruit, much upstream effort and expense to bring the fruit to that point will have been wasted. Building the belt and flights of open wire work is considered an acceptable solution to the first-mentioned design problem. For an acceptable solution to the second-mentioned problem, the individual flights 312 are each constructed to include a bracket 314 for instance of stainless steel sheet having a longitudinal portion 316 which is for instance about 9/16 inch wide and as long as the conveyor belt is wide. The portion 316 has holes 318 through it by which it is bolted to the metal mesh conveyor belt. At the two opposite ends of the portion 316, the bracket 314 is bent up to form two opposite sides 320 which project at about a 65 degree angle from the conveyor belt upstream. The sides 320 may, of course, be welded or otherwise secured to the ends of the portion 316, rather than being initially integral with it. The flight 312 is completed by a plurality of parallel wire rods having opposite ends secured to the bracket sides 320 in arcs so that each flight is arcuate toward an upstream direction.

The conveyor 138 frame further includes braces 322, 324 extending rearwardly and downwardly from the side plates 298, 300 so that each conveyor 138 may simply be rested via its braces 322 on the outer sidewall of the sorting tank adjacent the sorting channel and on the top of the island 108. It should be noted that when the horizontal braces 322 are so supported the conveyor lower sprocket is just submerged in the sorting solution so that the flights extend about 4–6 inches below the upper surface of the sorting solution and the conveyor is canted about 30 degrees downstream from vertical.

The conveyors 138 are preferably each self-contained in that the frame of each mounts an electric motor 326 coupled to one of the conveyor shafts, preferably the upper one, in a driving sense, for instance via pulleys and an endless drive belt as generally illustrated. Suitable electrical outlet boxes may be provided on the outside of the sorting tank or its frame and flexible electrical cable having suitable end connectors used to plug the motors 326 into the electricity supply. Thus the number and positioning of the conveyors 138 may be varied as needed.

The conveyor assemblies 138 are each completed by wire mesh screening 328 which extends between the outer edges of the side plates 298, 300 on the return half of the conveyor, at least from below the lower sprocket to above the level fruit would float in the sorting solution. When two conveyors 138 are used spacedly adjacent one another to collect fruit from adjacent zones defined thereby, should most of the fruit collect in the downstream zone, the mesh 328 of the upstream conveyor will prevent fruit collected in the downstream zone from backing into the returning flights of the upstream conveyor and being damaged or carried under the upstream conveyor by its returning flights, and into the zone from which upstream conveyor is collecting. The screening 328 may extend up to above the upper sprocket of each respective conveyor to prevent fruit which for any reason does not fall free of the flights onto the collector 140 at the upper end of the conveyor, from falling into the next downstream zone.

Figure 11:
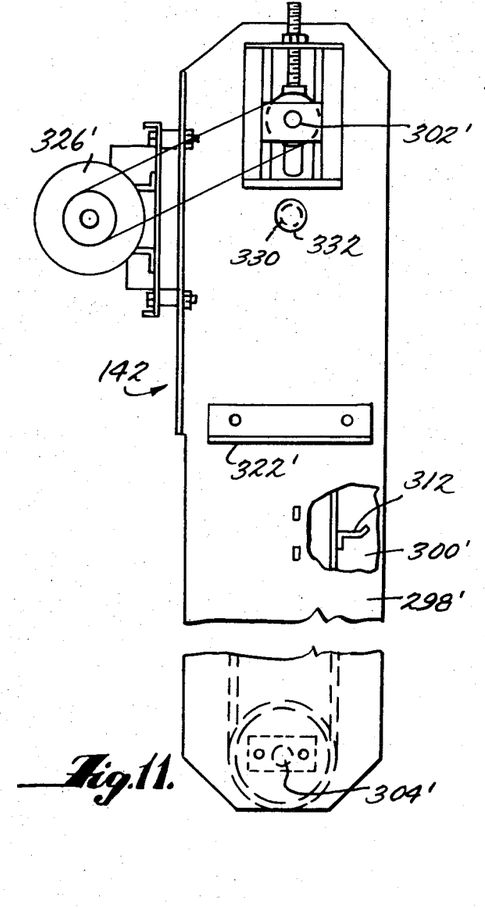
FIG. 11 is a side elevation view of the trash conveyor of the illustrated apparatus.
Figure 13:
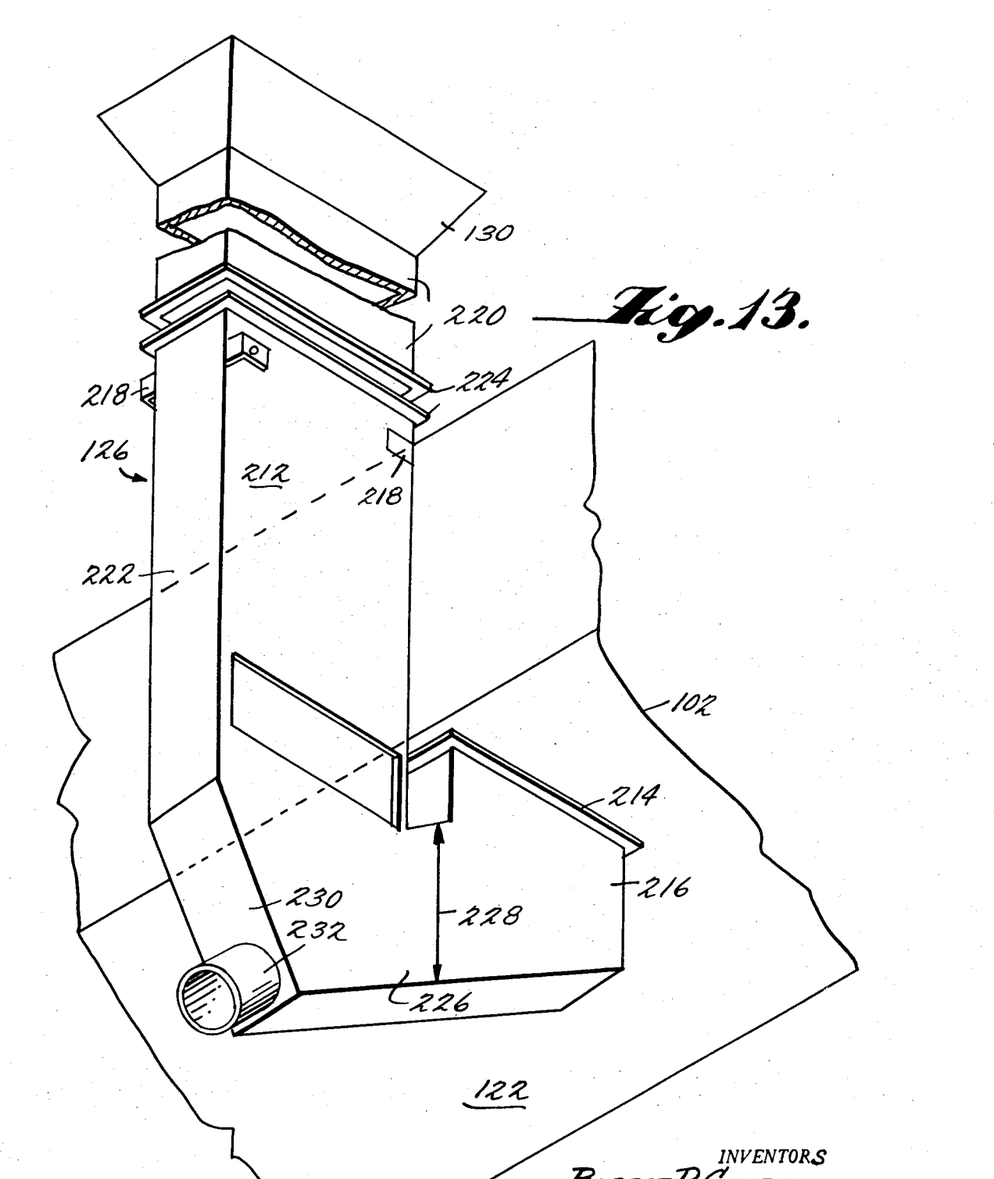
FIG. 13 is a perspective view from below of the body of the preferred article input device in accordance with the principles of this invention.

The end conveyor 142 (FIG. 11) is so similar in structural aspects to the skimming conveyors 138 just discussed, that its corresponding parts are provided with primed numeral designators in FIG. 11. The principal difference of importance is that the conveyor 142 is suspended via the brackets 322' so that it depends to the bottom of the sorting channel. Thus any debris, nonfloating, still midway suspended late floating material will be lifted by its flights to a trash chute 140. Since the conveyor flights 312' are more likely to be carrying small pieces of broken fruit and trash the conveyor 142 may usually be positioned vertically as shown without undue danger of trash falling off before it reaches the chute 140.

The side plates 298', 300' of the end conveyor 142 between them mount a wash pipe 330 having spray openings along its length, aimed to wash trash from the flights 312' as shown. The wash pipe 330 is provided with solution under pressure via a hose connection at 332 (see also FIG. 12).

Where the sorting operation does not produce a significant amount of trash and debris, the end conveyor 142 may simply provide the collecting means for the downstream-most segment of the fruit dynamically sorted by density difference.

It bears re-emphasis here that the article input device of the invention, although very useful in the processing of edible articles in bodies of liquids, has broad applicability for the purpose of inserting articles into bodies of liquids.

It should now be apparent that the article input device for liquid-containing apparatus as described hereinabove possesses each of the attributes set forth in the specification under the heading "Summary of the Invention" hereinbefore. Because the article input device for liquid-containing apparatus of the invention can be modified to some extent without departing from the principles of the invention as they have been outlined and explained in the specification, the present invention should be understood as encompassing all such modifications as are within the spirit and scope of the following claims.

What is claimed is:

1. In combination: wall means defining a container for containing a body of buoyant liquid up to a level therein, said wall means having means defining an opening therethrough below said level; a tubular input device located exteriorly of said wall means and having one end secured to said wall means peripherally of said opening so that said device communicates with said body of liquid through said opening; said tubular input device further having an opposite end located above said level; an aerator mounted on said tubular input device remotely from said opposite end, said aerator having an output side in communication with the bore of said tubular input device and having an input side equipped to receive a supply of compressed gas, whereby compressed gas supplied to said input side emerges into said liquid within said tubular input device as a less buoyant slurry of rising gas bubbles and said liquid; said tubular input device opposite end being equipped to receive articles deposited therein, whereby the deposited articles may fall through said slurry and emerge into said container below said level;

said tubular input device being generally J-shaped, having a longer leg, a shorter leg and a shaped transitional section joining said longer and shorter legs; said opposite end being the upper end of said longer leg; said one end being the upper end of said shorter leg and said wall means including a bottom and opposing side walls, said opening being through said bottom;

said aerator being incorporated in said longer leg of said tubular input device adjacent said shaped transitional section whereby said slurry is substantially confined to said longer leg;

means defining at least one fluid jet opening into said tubular input device below said aerator and means for supplying said at least one fluid jet opening with pressurized fluid; said at least one fluid jet opening being aimed to direct pressurized fluid issuing therefrom into said transitional section and toward said shorter arm, whereby articles falling through said less buoyant slurry to the level of said at least one fluid jet and which are impinged upon by said at least one fluid jet are transferred through said transitional section into said shorter arm and rise therein, due to the buoyancy of said liquid, and emerge through said opening into said container.

2. The combination of claim 1 wherein said aerator comprises an air-porous plate and a manifold covering the exterior of said air-porous plate, said manifold having means defining a compressed air inlet pipe.

3. The combination of claim 2, said manifold being provided with deflector means engaging the flow from said compressed air inlet pipe for preventing excessive concentration of impingement of pressurized air upon said porous plate.

4. The combination of claim 2 further comprising at least a second said aerator incorporated in said tubular input device longer leg at substantially the same level as the first mentioned aerator.

5. A method for loading articles into a body of liquid comprising: establishing and maintaining a slurry of gas bubbles and said liquid in a confined columnar portion of said body; depositing said articles into said slurry in said confined columnar portion whereby said articles fall gently through said slurry into the remainder of said body of liquid; and jetting the articles which have fallen through said slurry, toward the remainder of said body of liquid by impinging fluid under pressure against said articles at the lower extent of said confined columnar portion below said slurry.

6. The method of claim 5 further including jetting the articles which have fallen through said slurry, toward the remainder of said body of liquid by impinging fluid under pressure against said articles at the lower extent of said confined columnar portion.

References Cited
UNITED STATES PATENTS

| 2,620,069 | 12/1952 | Wendt | 209—172.5 |
| 2,038,451 | 4/1936 | Schattaneck | 261—122 X |
| 800,480 | 9/1905 | Palmer | 209—161 |
| 2,590,756 | 3/1952 | Colin et al. | 209—208 X |
| 3,371,779 | 3/1968 | Hollingsworth et al. | 209—170 X |

FRANK W. LUTTER, Primary Examiner

R. J. HILL, Assistant Examiner

U.S. Cl. X.R.

209—173; 302—66